United States Patent [19]

Peters et al.

[11] 4,410,138
[45] Oct. 18, 1983

[54] UNIT INJECTOR COOLED BY TIMING CONTROL FLUID

[75] Inventors: Lester L. Peters; Timothy A. Warlick, both of Columbus, Ind.

[73] Assignee: Cummins Engine Company, Inc., Columbus, Ind.

[21] Appl. No.: 336,493

[22] Filed: Dec. 31, 1981

[51] Int. Cl.³ .................... F02M 45/00; F02M 53/04; F02M 55/00
[52] U.S. Cl. .................................. 239/95; 239/125; 239/132.3
[58] Field of Search .................................. 239/88-91, 239/93-95, 124, 125, 132.3, 132.5, 533.2, 533.12, 584

[56] References Cited

U.S. PATENT DOCUMENTS

| | | |
|---|---|---|
| 2,313,264 | 3/1943 | Reggio . |
| 2,863,438 | 12/1958 | Challis . |
| 2,984,230 | 5/1961 | Cummins . |
| 2,997,994 | 8/1961 | Falberg . |
| 3,083,912 | 4/1963 | Shallenberg . |
| 3,351,288 | 11/1967 | Perr . |
| 3,544,008 | 12/1970 | Reiners et al. . |
| 3,557,765 | 1/1971 | Nystrom . |
| 3,847,510 | 11/1974 | Fenne . |
| 3,859,973 | 1/1975 | Dreisin . |
| 3,951,117 | 4/1976 | Perr . |
| 4,249,499 | 2/1981 | Perr . |

FOREIGN PATENT DOCUMENTS 202734  7/1956  Australia .
1080311  8/1917  United Kingdom .

Primary Examiner—Andres Kashnikow
Attorney, Agent, or Firm—Sixbey, Friedman & Leedom

[57] ABSTRACT

A unit injector (200, 300, 400, 500, 600) of the cam actuated, open nozzle type is disclosed including an extremely compact injector body (202, 302, 402, 502) having a minimum number of internal flow passages and a two piece injector plunger (222, 308, 310, 412, 506, 510, 606, 612) arranged to provide pressure/time metering (all embodiments), scavenging fuel flow (all embodiments), hydraulic timing (all embodiments), fuel cut off (embodiments of FIGS. 1, 3 and 4), wear compensation in advance timing mode (all embodiments) and sharp cut off of fuel injection without high "crush" loads and wear compensation in retard and advance modes (embodiment of FIG. 3). All embodiments of this invention are characterized by an injector body (202, 302, 402, 502) having an exterior shape designed to form a fuel supply flow path and an isolated fuel drain flow path between the exterior surface of the injector body (202, 302, 402, 502) and the interior surface of the recess in which the injector (200, 300, 400, 500, 600) is designed to be received. This arrangement allows a very simple pattern of passages (mostly radial passages) to be formed in the injector body.

11 Claims, 9 Drawing Figures

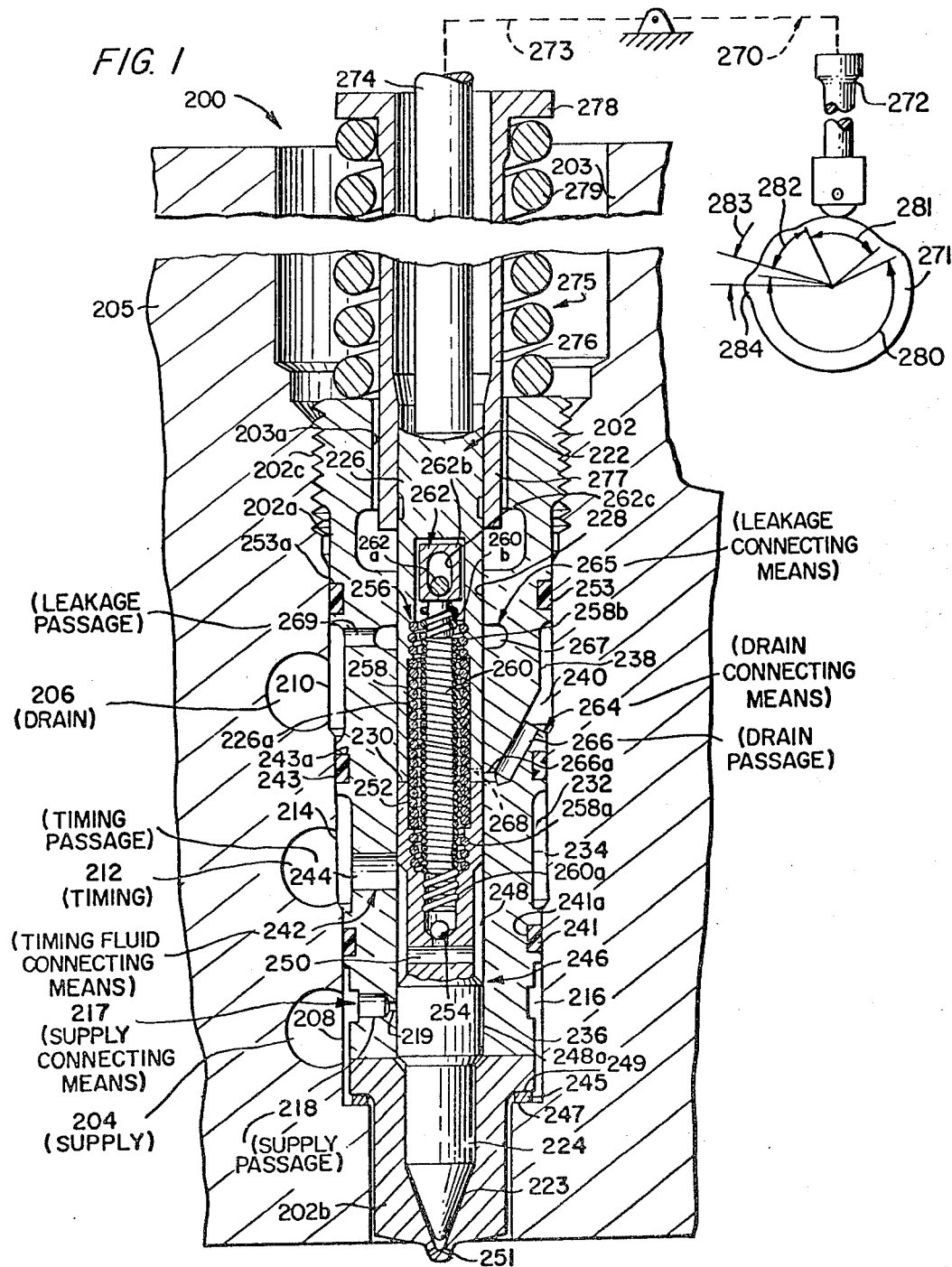

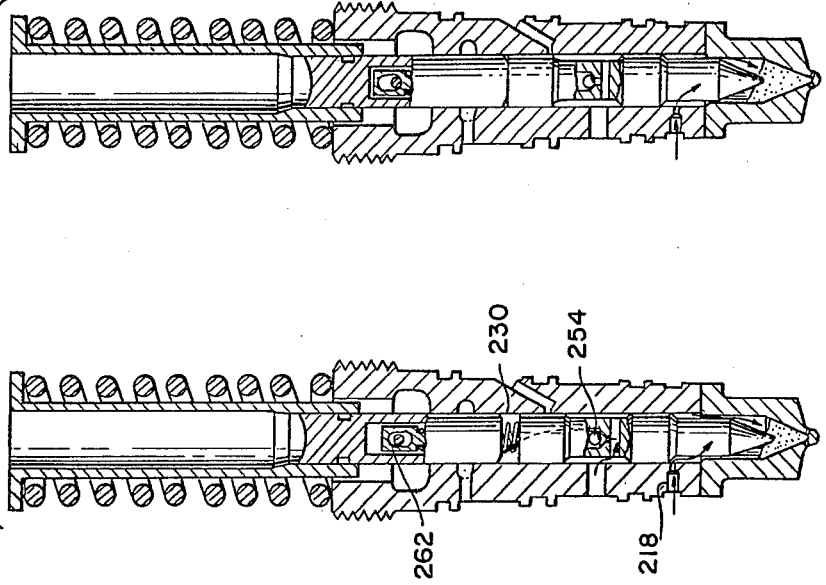
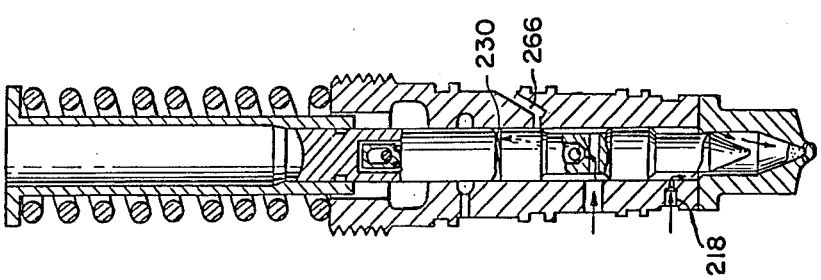
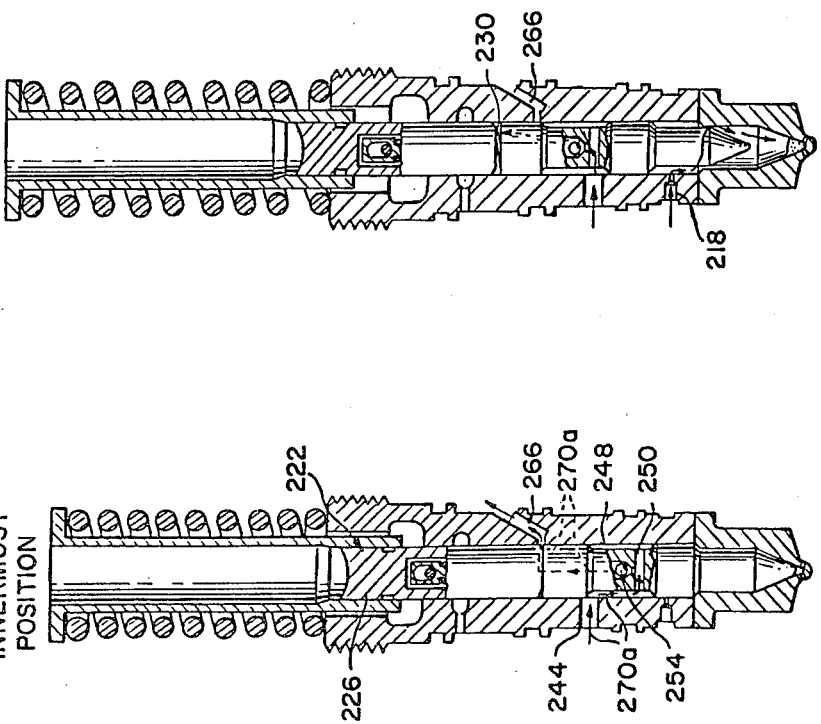

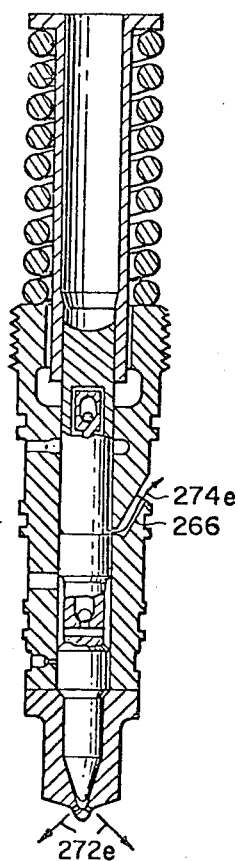

FIG. 2e.

PLUNGER HAS JUST REACHED INNERMOST POSITION

FLUID IN TIMING CHAMBER HAS BEEN EXHAUSTED THROUGH DISCHARGE PASSAGE - FLUID IN INJECTION CHAMBER HAS BEEN INJECTED - SCAVENGING FUEL FLOW IS JUST BEGINNING

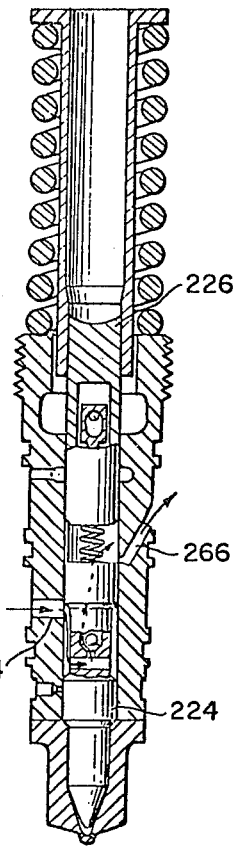

FIG. 2f.

REARWARD PLUNGER SECTION IS RECIPROCATING; INNER PLUNGER SECTION IS BEING HELD IN INNER POSITION

TIMING FLUID IS AT BRAKING PRESSURE DOWNWARD FORCE ON INNER PLUNGER SECTION IS GREATER THAN COMBINED FORCE OF EXTENSION SPRINGS

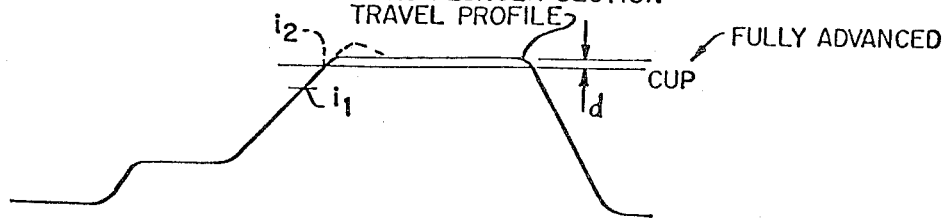

FIG. 3a.

REARWARD PLUNGER SECTION TRAVEL PROFILE

UNIT INJECTOR COOLED BY TIMING CONTROL FLUID

DESCRIPTION

1. Technical Field

This invention relates to a miniaturized, variable timing fuel injector having a two piece injector plunger mechanically actuated by an engine camshaft.

2. Background Art

Internal combustion engine designers have increasingly come to realize that substantially improved fuel supply systems are required in order to obtain higher levels of pollution abatement and increased fuel economy. Among the known options, direct fuel injection appears to be one of the best candidates for achieving improved performance but higher initial costs have tended to discourage its general adoption. This situation is accentuated by the fact that only the more sophisticated, and therefore normally the more expensive, direct injection systems are capable of achieving the increasingly higher performance goals of engine manufacturers.

Up to the present, attempts to provide a low cost fuel injection system have tended to center on distributor type fuel injection systems having a single centralized high pressure pump and a distributor valve for metering and timing fuel flow from the pump to each of a plurality of injection nozzles, such as disclosed in U.S. Pat. No. 3,557,765. Although simple in design concept, systems of this type generally suffer defects inherent with separation of the injector nozzles from the centralized pump. Unit injector systems avoid the inherent defects of distributor type systems by providing each engine cylinder with its own cam-actuated pump such as disclosed in U.S. Pat. No. 3,544,008. Nevertheless, the performance advantage of unit injectors have generally not outweighed the detriment of greater costs except for heavy duty compression ignition engine applications.

While unit injectors have not normally been employed in low cost fuel systems, numerous refinements have been proposed over the years in an attempt to lessen their cost while retaining their inherent advantages. For example, the assignee of this application, Cummins Engine Company, Inc., has developed an open nozzle, pressure/time unit injector (see U.S. Pat. Nos. 3,351,288 and 3,544,008) which is characterized by the need for only a single supply line (common rail) for supplying fuel to all of the injectors. Because fuel is metered into each injector through a separate feed orifice, the time during which each feed orifice is open and the pressure within the common rail can be relied upon to control the quantity of fuel metered for injection during each injection cycle. Additional cost reductions are realized because an open nozzle unit injector does not require a pressure relief valve at the injection orifice.

While effective in providing cost reductions, certain precautions are usually required in pressure/time, open nozzle injector systems to insure that combustion gases and spurious pressure signals do not enter the fuel supply system. These precautions may include the use of a check valve, upstream from the feed orifice of the injector to discourage combustion gases (known as blow-back) from entering the fuel supply. It is also common to provide for scavenging flow of fuel through the injector to remove gases which may have entered the fuel supply line. Scavenging flow additionally serves the function of cooling the injector and would be useful even if it were unnecessary to remove blow-back gases. Thus, a commercially acceptable unit injector, even when designed in accordance with principles intended to simplify the injector structure, is typically a labyrinth of axial and radial drillings. As used in this application, "axial" means parallel with the longitudinal axis of the injector and "radial" means perpendicular to the longitudinal axis of the injector. Moreover, the injector body is usually formed of multiple components requiring very close tolerance controls.

The problem of complexity is further magnified when it is desired to provide a cam operated unit injector with the capability of advancing and/or retarding fuel injection during each injector cycle. U.S. Pat. Nos. 4,249,499 and 3,951,117 provide examples of pressure/time unit injectors which respond to a hydraulic variable pressure signal to control injector timing. Both of these patents disclose unit injectors in which a variable length hydraulic link is inserted into the mechanical actuating train between the engine cam shaft and the injector plunger which reciprocates to force fuel through the injector nozzle. FIGS. 16 and 17 of U.S. Pat. No. 3,951,117 specifically disclose a cam actuated, pressure/time type, open nozzle injector wherein the injector plunger is formed in two sections to create a timing chamber between them. During the metering portion of the injector cycle, fuel is metered into the timing chamber in an amount corresponding to the pressure of the fuel supplied thereto. Numerous other examples of cam actuated unit injectors employing hydraulically variable timing are known such as disclosed in U.K. Pat. No. 1,080,311 and U.S. Pat. Nos. 2,863,438, 3,847,510 and 3,859,973. Hydraulic timing control is also known in other types of fuel injectors such as disclosed in U.S. Pat. No. 3,083,912 wherein a reciprocating piston is subjected to hydraulic pressure against the bias of a coil spring to control injector timing. In addition to purely hydraulic control, mechanical and hybrid mechanical/hydraulic variable timing controls have been applied to cam actuated unit injectors as illustrated in U.S. Pat. Nos. 2,313,264 and 2,997,994. Such mechanical systems tend, however, to increase the overall size and cost of the fuel injection system to say nothing of the possibility for mechanical malfunctions. If other injector capabilities are desired, such as the capability to cut off fuel flow entirely (see U.S. Pat. No. 2,984,230), the structure of the injector will normally become still more complex.

In very simple cam actuated injectors such as illustrated in Australian Patent No. 202,734, axial drillings have been eliminated from the injector body by forming a flow path between the exterior of the injector body and the interior of the recess in which the injector body is received. By this arrangement, an easily formed radial bore may be provided in the injector body to act as a feed passage from the supply flow path surrounding the injector body into the injector chamber of the unit injector. If the injector is capable of providing a scavenging fuel flow as illustrated in U.S. Pat. No. 3,351,288, the number of necessary flow passages increases and the overall size of the injector must increase to accommodate such passages. Multi-function injectors of this type normally require at least one or more axial passages. Such passages are more difficult and costly to form and have not been eliminated even in injector designs in which the supply and drain lines leading to and from the injector are formed entirely within the engine head such as is illustrated in U.S. Pat. No. 3,351,288.

In short, fuel injectors capable of meeting rigorous operation specifications have invariably been highly complex, costly to manufacture, and/or relatively large in size.

DISCLOSURE OF THE INVENTION

The first object of this invention is to overcome the deficiencies of the prior art as disclosed above by providing a compact unit injector employing variable hydraulic timing in which the flow path through which fluid is supplied and discharged to the timing chamber of the injector also serves as a flow path for cooling fluid flow through the injector.

The second object of this invention is to provide a compact unit injector including a two piece injector plunger arranged to form a hydraulic, variable length timing chamber between the plunger sections and including an injector body containing a simplified arrangement of flow passages including a single flow path for timing fluid and cooling fluid.

The third object of this invention is to provide a unit injector including a two piece, reciprocating injector plunger arranged to form a variable length timing chamber between the inner and outer plunger sections in which one of the plunger sections includes a passage for supplying fluid to the timing chamber and a check valve means mounted within the passage for (1) permitting flow of timing fluid into the timing chamber when the plunger is in its outermost position, (2) trapping timing fluid within the timing chamber during the injection period and (3) permitting flow of cooling fluid through the timing chamber when the plunger is in its innermost position.

A fourth object of this invention is to provide a compact unit injector including a two-piece injector plunger arranged to form a hydraulic, variable length timing chamber between the plunger sections and further including biasing means for urging the plunger sections together with a force which is a stepped function of the distance between the plunger sections such that fluid may be supplied to and discharged from the variable length chamber to provide the following functions: timing, wear compensation, sharp cut off of fuel injection and total fuel cut off during engine braking. These functions are controlled by the axial position of the plunger sections and the pressure of fluid supplied to the plunger through a passage and check valve assembly located in one of the injector plungers.

Other and more specific objects of this invention may be understood from an examination of the following Brief Description of the Drawings and Best Mode for Carrying Out the Invention.

BRIEF DESCRIPTION OF THE DRAWINGS

FIG. 1 is a partially broken away, cross-sectional view of an unit injector designed in accordance with the subject invention in which the injector provides both variable timing and a sharp fuel shut off at the end of each injection function.

FIGS. 2a-2f are cross-sectional views of the unit injector of FIG. 1 operating in different phases.

FIG. 3a is a chart which illustrates how the injector embodiment of FIG. 3 is capable of achieving a sharper end of injection.

BEST MODE FOR CARRYING OUT THE INVENTION

Figure 3:
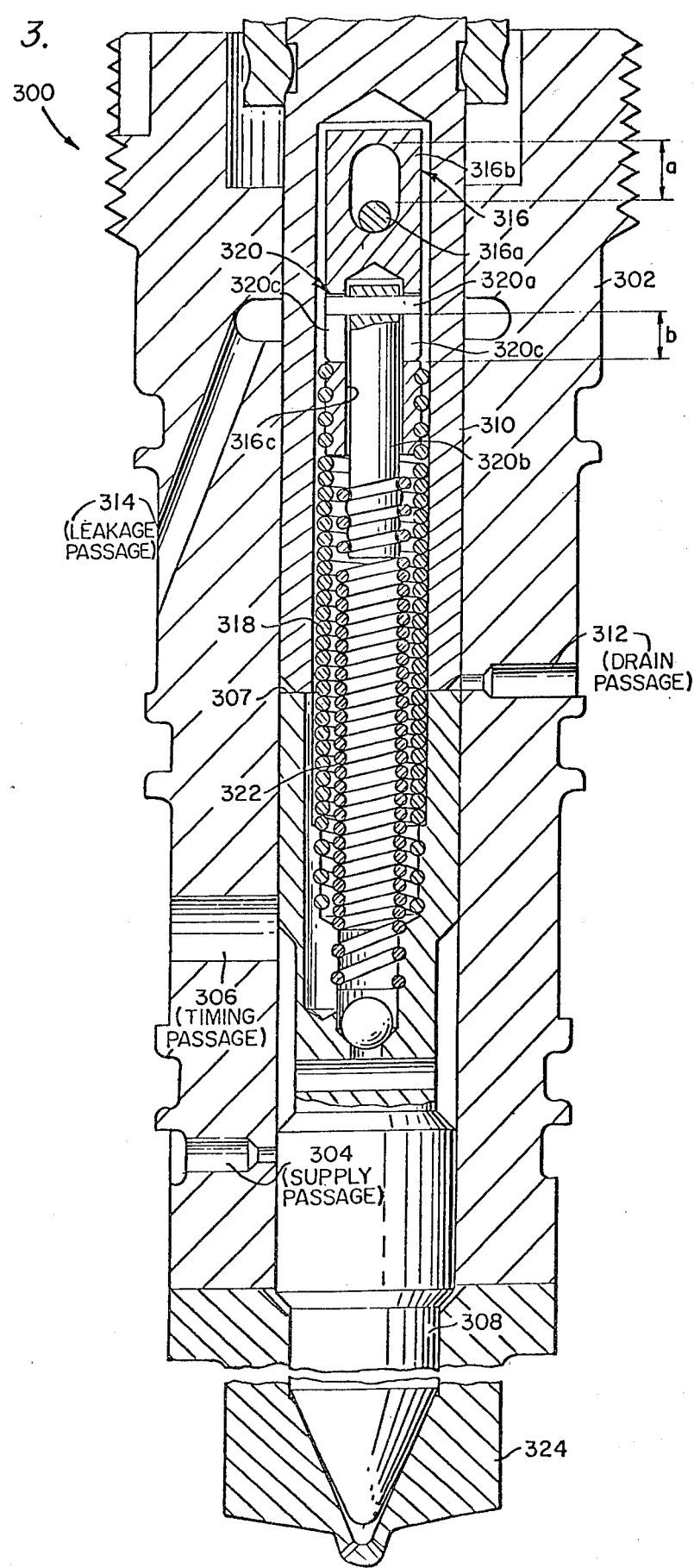
FIG. 3 is a cross-sectional view of another embodiment of the subject invention in which a wear compensation function and a sharp end of injection function during the retard mode of operation have been added to the injector design of FIG. 1.

Throughout this application, the words "inward" and "outward" will correspond to the directions, respectively, toward and away from the point at which fuel from an injector is actually injected into the combustion chamber of an engine. To further aid in an understanding of this invention, an index of the elements identified by reference numerals in the drawings is listed at the end of this description of the Best Mode for Carrying out the Invention.

FIG. 1 illustrates an open nozzle, pressure/time unit injector designed in accordance with the subject invention. In particular, FIG. 1 shows a unit injector 200 including an injector body 202 received in a recess 203 contained in the head 205 (only partially illustrated) of an internal combustion engine. Injector body 202 is actually formed in two sections including an outer section or barrel 202a and inner section or cup 202b which are integrally joined together. As is apparent from FIG. 1, injector body 202 is held within the recess 203 by means of mating screw threads 202c and may be placed in position by means of a wrench adapted to mate with a hexagonal socket 203a contained in the outer end of the injector body 202. Fuel supply and drainage is provided for the injector through passages contained entirely within head 205. In particular, supply channel 204 (sometimes referred to as common rail) is adapted to supply fuel to the unit injector 200 while drain channel 206 is adapted to receive fuel discharged from the injector for return to the fuel supply system. Both supply channel 204 and drain channel 206 may be formed to communicate with each of a plurality of injectors positioned within head 205 to eliminate all external flow passages to and from the injectors contained in the engine head. In addition to the fuel supply channel 204 and fuel drain channel 206, which communicate with recess 203 through supply port 208 and drain port 210, respectively, an additional timing channel 212 is formed in the engine head intermediate the drain and supply channels to provide timing fluid to each of the injectors within the engine head. This timing channel 212 communicates with recess 203 through a timing port 214.

The exterior surface of injector body 202 is shaped to provide three annular recesses 236, 234 and 238 axially spaced to communicate with channels 204, 212 and 206 through supply ports 208, timing port 212 and drain port 210, respectively. By this arrangement, a supply flow path 216 is formed between supply port 208 and the exterior surface of the injector body 202 defining recess 236. Similarly, a drain flow path 240 is formed between drain port 210 and the exterior surface of the injector body 202 which defines annular recess 238. A timing fluid flow path 232 is formed by annular recess 234 placed between supply flow path 216 and drain flow path 240. In order to isolate supply flow path 216 from timing flow path 232, a circumferential seal 241 is positioned between injector body 202 and the interior surface of recess 203. As is apparent from FIG. 1, the circumferential seal 241 is positioned within a small annular groove 241a located between annular recesses 234 and 236. A similar type of circumferential seal 243 is positioned within a second small annular groove 243a located between annular recesses 234 and 238 to insure against fuel leakage between the timing flow path 232 and the drain flow path 240. The inner end of supply flow path 216 is sealed by means of a washer-like seal element 245 compressibly held between an inwardly directed lip 247 formed in recess 203 and a radially outwardly directed surface 249 formed on injector body 202. An outer circumferential seal 253 received in small annular groove 253a on the injector body 202 above (as illustrated in FIG. 1) annular recess 238 serves to seal the drain flow path 240 against outward leakage of fuel. Preferable the drain channel should be formed outwardly from the supply and the timing channel to prevent fuel under pressure from leaking out of injector receiving recess 203.

Injector body 202 contains a central bore 228 which is coaxial with the longitudinal axis of the injector body 202. At the inner (lower) end of the injector body 202, one or more small injection orifices 251 are contained to provide a communication path between central bore 228 and a combustion chamber. Fuel is supplied through injection orifices 251 to the combustion chamber by the injector in controlled synchronism with the operation of the corresponding cylinder piston (not illustrated). Positioned within central bore 228 is an injector plunger 222 adapted to reciprocate in response to a cam-actuated mechanism 270 including a specially profiled cam lobe 271, connected to the conventional cam shaft (not illustrated) of the engine, a push rod 272, rocker arm 273 and a link 274. Because cam lobe 271 rotates in a fixed manner relative to the reciprocating motion of the cylinder piston, plunger 222 may have its reciprocating motion very precisely controlled with respect to the cylinder piston by carefully shaping the profile of cam lobe 271. Cam mechanism 270 may be of the type which employs a stepped cam to hold, during a sustained period of each injection cycle just prior to injection, the injector plunger in an inward position in which the feed orifice of the injector is closed to prevent combustion gas blow back. A cam-actuated mechanism of this type is disclosed in the commonly assigned application to Lester Peters entitled Fuel Injector Assembly Including a Blow-Back Prevention Cam Ser. No. 336,334 filed Dec. 31, 1981. The entire disclosure of that application is incorporated by reference.

Essentially, injector plunger 222 reciprocates between an inner position in which injection orifices 251 are closed by the forward end 223 of plunger 222 and an outermost position in which an injection chamber is formed within central bore 228 between the forward end 223 and the injection orifices 251. Since this invention relates to injectors of the "open nozzle" type, orifices 251 remain open to the combustion chamber whenever injection plunger 222 is retracted from its innermost position. Injectors of this type have an inherent cost advantage over more complex closed nozzle injectors which employ a pressure released tip value for maintaining the injection orifice in a closed condition except during the injection event. Injection plunger 222 is permanently biased toward its outermost position by a plunger return means 275 including a sleeve like coupler 276 connected at its lower end 277 to the upper end of injection plunger 222. A radially, outwardly directed flange 278 is positioned adjacent the topmost portion of coupler 276. A fairly high pressure compression spring 278 extends between the upper end of injector body 202 and flange 278 to continually bias plunger 222 in the outer direction.

To control the amount of fuel injected during each forward movement of injector plunger 222, the subject injector is provided with a "pressure/time" injection capability in which fuel is metered into the injection chamber before each injection stroke through a fill or feed orifice which has been carefully dimensioned to allow the amount of fuel injected to be varied within a given amount of time by varying the supply line (common rail) pressure. Thus, the amount of fuel actually metered is a function of the supply pressure and the total metering time during which fuel flows through the feed orifice. This principle is applied to the subject unit injector by provision of a supply connecting means 217 for providing a pathway for fuel under pressure to flow from the supply flow path 216 into a section of the central bore 228 which forms the injection chamber. The supply connecting means 217 includes a supply passage 218 extending from the exterior surface of the injector body 202 to the interior surface of the central bore 228 along a straight radial path perpendicular to the longitudinal axis of the injector body 202. A restricted portion of supply passage 218 forms a feed orifice 219 which has carefully controlled hydraulic characteristics in order to produce the desired pressure/time metering capability discussed above.

The amount of time which the injector plunger 222 dwells in either the innermost or outermost position depends in part upon the profile of cam lobe 271. As is apparent from FIG. 1, a preferred design for cam lobe 271 includes one sector 280 comprising more than 180° of the total circumference. This sector causes the injector plunger to assume its innermost position. A second sector 281, comprising almost 90° of the total circumference, causes plunger 222 to assume its outermost position.

Separating first sector 280 and second sector 281 is a third sector 282 which functions to move the injector plunger 222 to a supply passage blocking position in which the injector plunger 222 is moved inwardly sufficiently to close off feed orifice 219 but does not move the injector plunger 222 sufficiently to actually initiate fuel injection. Third sector 282 is shaped to cause feed orifice 219 to be closed during the time that combustion chamber pressures are rising to a sufficiently high level to cause significant blow back of combustion gases into the fuel supply line. A fourth small sector 283 of the cam lobe 279 represents approximately that portion of the cam lobe 271 which causes actual fuel injection. The point at which injection begins is approximate since it depends in part upon the amount of fuel metered into the injection chamber during each cycle.

First sector 280 engages the lower end of push rod 272 at the point just before the engine piston executes its power stroke and continues to engage push rod 272 throughout the exhaust stroke and a portion of the intake stroke of the piston. Second sector 281 engages rod 272 approximately halfway through the intake stroke of the piston and ceases to engage rod 272 approximately halfway into the compression stroke. Second sector 281 defines the time during each injector cycle when fuel is metered into the injection chamber. Third sector 282, which causes the injector plunger 222 to move toward its innermost position sufficiently to close the feed orifice 219 but not to cause injection, is positioned to engage push rod 272 approximately halfway through the compression stroke and to continue this engagement up to the point at which injection commences. The fourth small sector 283 is that portion of cam lobe 271 which causes injector plunger 222 to move from its outermost position to its innermost position to force the metered fuel in the injection chamber through injection orifices 251 into the combustion chamber of the engine. A slightly raised dimple 284 exaggerated in FIG. 1 is formed on cam lobe 271 near the end of fourth sector 283 to place a "crush load" on injector plunger 222 at the end of the injection event in order to hold the injector plunger 222 tightly against the injector cup 202b. This ability to hold injector plunger 222 very tightly against the injector cup 202b insures that injection orifices 251 will be sharply closed and will remain closed at the end of each injection period even during the retard mode of operation of the injector embodiment of FIG. 1. An essential characteristic of the injector of FIG. 1 is that it allows the fuel injection event to be advanced relative to the movement of the associated engine piston by the simple expedient of varying the pressure of a timing fluid supplied through the timing fluid channel 212. Since all of the engine injectors are in communication with the same timing channel, a very simple control may be provided to change the timing of all of the engine injectors.

To permit this adjustment in timing, the injector plunger 222 of each injector is formed in two sections including an inner plunger section 224 and an outer plunger section 226. The two sections are independently mounted within the central bore 228 of the injector body 202 to form a variable volume timing chamber 230 (illustrated in its fully collapsed condition). Timing fluid is supplied to chamber 230 by the timing fluid flow path 232.

Timing fluid flows into the central bore 228 through a timing fluid connecting means 242 which provides a pathway for fuel flow from the timing fluid flow path 232 into the central bore 228. The timing fluid connecting means 242 includes a timing passage 244 extending from the exterior surface of the injector body 202 to the interior surface of the central bore 228 along a straight radial path perpendicular to the longitudinal axis of the injector body 202. The exterior surface of inner plunger section 224 is shaped to form a flow control means 246 for controlling the flow of fuel and timing fluid within the injector. In particular, the flow control means 246 includes an annular groove 248 axially positioned to communicate at all times with timing passage 244. Flow control means 246 further includes a transverse passage 250 in the inner portion of annular groove 248 to communicate at its ends with the space formed by annular groove 248 within central bore 228. The outer end of inner plunger section 224 contains a recess 252 at the bottom of which is a ball-type check valve 254 designed to allow one way fluid flow from the transverse passage 250 into the recess 252. It should be apparent from FIG. 1 that recess 252 communicates directly with the variable volume timing chamber 230 in a manner to permit the flow of timing fluid through timing passage 244, annular groove 248, transverse passage 250, check valve 254 and recess 252. Flow control means 246 on inner plunger section 224 also includes a cylindrical land 248a which sealingly engages the interior surface of central bore 228 to seal the space within central bore 228 defined by annular groove 248 from the injection chamber of the injector. As illustrated in FIG. 1, cylindrical land 248a is axially positioned to open and close feed orifice 219 in the manner described above.

Biasing means 256 is provided for continuously biasing the inner and outer plunger sections together. Biasing means 256 includes first helical extension spring 258 connected integrally at each end, respectively, to the plunger sections to apply at all times at least a first predetermined force tending to bring the plunger sections together. A second helical extension spring 260 mounted coaxially within the first extension spring 258 is connected at one end to inner plunger section 224 and at the other end to outer plunger section 226 by a lost motion connection means 262 to cause the second extension spring to apply a second predetermined force tending to bring the plunger sections together whenever the plunger sections are separated by more than a predetermined distance defined by the lost motion connection means 262. As illustrated in FIG. 1, lost motion connection means 262 is positioned with an inwardly opening recess 226a formed in outer plunger section 226. The lost motion connection means 262 includes a pin 262a extending through recess 226a generally perpendicular to the longitudinal axis of the outer plunger section 226. The ends of pin 262a are fixed in the same manner, such as by press fitting, to the adjacent portion of outer plunger section 226. Held within recess 226a by pin 262a is an anchor element 262b containing an elongated opening 262c which receives pin 262a. Obviously, the axial length of opening 262c defines the relative movement which may take place between outer plunger 226 and anchor element 262b when the injector plunger sections move from the position illustrated in FIG. 1 to a position in which second helical spring 260 will begin to apply a force on the plunger sections tending to pull the sections together. It is thus the axial length of opening 262c which defines the "lost motion" which may occur between the plunger sections before spring 260 becomes effective. The ends of extension spring 258 are connected by means of helical screw threads 258a and 258b to inner and outer plunger sections 224 and 226 respectively. Similarly, the ends of spring 260 are connected by screw threads 260a and 260b to the inner plunger section 224 and anchor element 262b. To prevent relative rotation of the plunger sections, the springs 258 and 260 are wound in opposite directions.

The unit injector illustrated in FIG. 1 includes a drain connecting means 264 for providing a pathway for fuel flow from the central bore 228 into the drain flow path 240 and a leakage connecting means 265 for providing a pathway for fuel leaked outwardly from the timing chamber 230 to flow into the drain flow path 240. The leakage connection means 265 includes an annular cavity 267 extending radially outwardly from the central bore 228 and a leakage passage 269 extending from the annular cavity 267 to the drain flow path 240. The drain connecting means 264 further includes a drain passage 266 extending obliquely from the central bore 228 to the exterior surface of annular recess 238. The point of communication between drain passage 266 and central bore 228 occurs at the axial location defined by the point of contact between the plunger sections when the inner plunger section 224 is in its innermost position as illustrated in FIG. 1. The innermost end of outer plunger section 226 includes radial passages or grooves 268 (illustrated in dashed lines) which are arranged to provide a fluid communication path for timing fluid to exit from the variable volume timing chamber 230 when the inner plunger section 224 is in its innermost position. Passage 266 includes a restricted portion 266a which operates to control the rate at which fluid is spilled from the timing chamber 230 as will be explained below.

The operation of the unit injector illustrated in FIG. 1 will now be explained with reference to FIGS. 2a-2f. In FIG. 2a, a cam actuating mechanism (not illustrated) has moved the injector plunger 222 to its innermost position in which all fuel metering has been cut off but timing fluid is flowing through the injector to provide one of the normal scavenging functions. In particular, the scavenging flow in the embodiment functions primarily to cool the injector. This function occurs when timing fluid, which may be fuel, enters the timing passage 244 and flows through annular groove 248, transverse passage 250, check valve 254, recess 252 (not illustrated) and grooves 268 to exit through drain passage 266. Because the cam actuating mechanism causes outer plunger section 226 to be held in its innermost position, the timing chamber 230 may not expand from its fully collapsed condition. The scavenging (cooling) flow path is illustrated by arrows 270a.

FIG. 2b shows the phase of injector operation in which the plunger has been moved to its outermost position to open the supply passage 218 and close drain passage 266 to begin to trap timing fluid within the variable volume timing chamber 230. In FIG. 2b both timing and metering have just commenced. Accordingly, very little fuel has been metered into the injection chamber. As disclosed above, metering is in accordance with pressure/time principles. Timing fluid flows into chamber 230 when the injector is in the phase illustrated in FIG. 2c only if the timing fluid pressure is sufficient to overcome the preload tension applied to the plunger sections by extension spring 258. FIG. 2c shows the effect of such a sufficiently high timing pressure having been applied at the moment that the injector plunger commences it inward movement. At this time, check valve 254 operates to trap the timing fuel within the timing chamber 230 to form a hydraulic link between the inner and outer plunger sections. If the timing pressure has not been sufficiently high, no expansion of the timing chamber 230 will have taken place as illustrated in FIG. 2d. It can, thus, easily be seen that the moment of fuel injection may be advanced by expanding the variable volume timing chamber 230 on a cycle by cycle basis. As long as the timing fluid pressure within chamber 230 does not exceed the combined tension force applied by the first and second extension springs 258 and 260, the maximum amount by which the timing chamber can be expanded is limited by the lost motion defined by lost motion connection means 262. While not contemplated for the preferred embodiments of this invention, timing advance could be made infinitely variable by operating the timing on the pressure/time principle. For example, the check valve opening could be carefully sized to limit the amount of fluid entering chamber 230 dependent upon the pressure of the timing fluid and the length of time that the injector is in the phase illustrated in FIG. 2c. Alternatively, the amount of timing advance could be made to depend on the precise pressure of the timing fluid alone independent of the timing period.

In FIG. 2e, the injector is shown in the condition assumed as the plunger reaches its innermost position. In moving from the condition illustrated in FIG. 2c to that illustrated in FIG. 2e, all of the fuel metered into the injection chamber is expelled through the injection orifice as illustrated by arrows 272e and any timing fluid metered into chamber 230 is expelled through the drain passage 266 as illustrated by arrow 274e. Thus, drain passage 266 also forms a timing fluid discharging means for providing a pathway for timing fluid to flow from the timing chamber 230 into the drain flow path 240. Accordingly, drain passage 266 also serves as a discharge passage for timing fluid.

During certain modes of engine operation, such as engine braking in which the engine is used to provide a braking function, it is often desirable to completely cut off all fuel injection. This function may be performed by substantially increasing the timing fluid pressure to a level such that the pressure within the variable timing chamber 230 exceeds the tension force applied by the first and second extension springs 258 and 260 thereby causing the inner plunger section 224 to remain in its innermost position while the outer plunger section 226 reciprocates under operation of the cam actuating mechanism. In this situation, timing fluid will flow into the timing chamber 230 during upward movement of the inner plunger section 224 and will be expelled through drain passage 266 upon downward movement of plunger 222.

It is now apparent that the unit injector embodiment of FIGS. 1 and 2 is capable of performing a variety of injector functions which have heretofore required a much greater number of injector components. In particular, this embodiment provides a pressure/time fuel metering function and a timing function as well as a cooling flow function using the timing fluid as a source of cooling fluid. The injector of FIG. 1 may also be operated to completely cut off fuel injection despite continued engine operation and reciprocation of the cam actuating mechanism.

FIG. 3 illustrates another embodiment of the subject invention in which wear compensation and a sharper end of injection capability (even when the injector timing is not advanced) have been added to the injector design of FIGS. 1 and 2a-2f by the inclusion of a second lost motion connection means. In particular, FIG. 3 illustrates an injector unit 300 including an injector body 302 formed in a manner similar to the injector body 202 of FIG. 1. The supply passage 304 and timing passage 306 are formed to function in the same manner as the corresponding passages in the embodiment of FIG. 1. However, the length of the inner plunger section 308 and outer plunger section 310 have been adjusted to cause the axial location of the variable volume timing chamber 307 to be moved axially outwardly (upwardly) to permit a dual function drain and discharge passage 312 to be formed in the injector body 302 along a radial path perpendicular to the longitudinal axis of the injector body 302. Leakage passage 314, however, is now formed obliquely with respect to the injector body 302.

A major difference between the embodiment of FIG. 3 versus the embodiment of FIG. 1 is the inclusion of an additional lost motion connection means 316 between the outer (upper end) of the first extension spring 318. By this arrangement, the plunger sections 308 and 310 will always undergo a predetermined separation during each injection cycle to define a minimum overtravel distance 'a' determined by lost motion connection means 316 (which may be considered the first lost connection means). Only after the plunger sections 308 and 310 are separated by the overtravel distance 'a' will first extension spring 318 begin to apply its preload tension to bias the plunger sections together. In a manner similar to the operation of the embodiment of FIG. 1, the second lost motion connection means 320 prevents second extension spring 322 from applying any additional biasing force to the plunger sections until the sections are separated by an additional "advance" distance 'b' determined by the characteristics of the second lost motion connection means 320.

First lost motion connection means 316 includes a pin 316a and anchor element 316b similar to the pin and anchor element of the embodiment of FIG. 1 except that anchor element 316b is directly connected by screw threads to the outer end of first spring 318 rather than the second spring 322. The second lost motion connection means 320 includes a second pin 320a and second anchor element 320b positioned within a downwardly opening recess 316c contained in anchor element 316b. Pin 320a is fixed to anchor element 320b and the outer ends thereof are held within longitudinally oriented slots 320c contained in anchor element 316b. Thus, the axial length of slots 320c define the amount of lost motion which may occur between anchor elements 316b and 320b before second spring 322 begins to apply a tension force which tends to pull the plunger sections together.

The functional benefits which derive from provision of the second lost motion connection means 320 can best be understood by reference to FIG. 3a in which the travel profile of outer (upper) plunger section 310 is plotted against degrees of cam rotation when the injector is operating in the retard mode, that is when the timing fluid pressure is insufficient to overcome the preload tension on spring 318 and thus the plunger sections are only separated by the distance 'a' defined by lost motion connection means 316. The sections become separated by the distance 'a' because a predetermined minimal pressure is always provided by the timing fluid. In response to this minimal pressure, the timing chamber 307 formed between sections 308 and 310 will always expand as the outer plunger section 310 moves outwardly. This minimal fluid timing pressure will not, however, overcome the preload tension in spring 318. Upon inner movement of the injector plunger sections by a cam (profiled, for example, like the cam of FIG. 1), the inner plunger section 308 will naturally reach the cup 324 of the injector body 302 before the outer plunger section 310 has reached its innermost position. This fact is shown by point $i_1$ in FIG. 3a, which shows that the outer plunger section 310 is still traveling in an inner direction when the inner plunger section 308 reaches the injector cup 324 to close off the injection orifice. At this time, the timing fluid trapped in the expanded timing chamber 307 is expelled through drain passage 312 at very high pressure to maintain the inner plunger section 308 in its innermost position. This mode of operation contrasts with the retard mode (non-advanced mode) of operation of the FIG. 1 embodiment in which the variable volume chamber 230 is fully collapsed before the forward plunger section 244 reaches the injector cup. This is illustrated by point $i_2$ in FIG. 3a. Because point $i_1$ occurs along a higher velocity portion of the travel profile, the inner plunger section 308 engages the injector cup 324 at a higher velocity than does the inner plunger section 224 of FIG. 1 to produce thereby a sharper end of fuel flow during injection. Moreover, the need for dimple 284 on the cam profile no longer exists since the timing fluid within the timing chamber insures that the inner plunger section 308 will be held tightly against the injector cup during the final stages of inward movement of the outer plunger section 310. FIG. 3a shows only a minimal overtravel 'd' of 0.018 inches after the plunger sections are brought into contact but before the outer plunger 310 reaches its innermost position. This arrangement allows elimination of the dimple 284 of the FIG. 1 cam profile which would have resulted in the additional overtravel of outer plunger 310 as illustrated by the dashed lines in FIG. 3a. Naturally, cam life is increased when the "crush load" created by dimple 284 can be eliminated. An additional benefit of the embodiment of FIG. 3 is that any wear which takes place in the injector actuation train is automatically compensated for by the creation of a minimal hydraulic link during the retard mode of injector operation.

As is apparent from the foregoing, the timing fluid supplied to any of the variable timing embodiments discussed in this disclosure would normally be engine fuel since this would eliminate any problems associated with mixing of dissimilar fluids in the engine drain channel.

Index to Reference Numbers 200 unit injector
202 injector body
202a barrel or outer section
202b cup or inner section
202c screw threads
203 recess
203a hexagonal socket
204 supply channel
205 head
206 drain channel
208 supply port
210 drain port
212 timing channel
214 timing port
216 supply flow path
217 supply connecting means
218 supply passage
219 feed orifice
222 injector plunger
223 forward end
224 inner plunger section
226 outer plunger section
226a inwardly opening recess
228 central bore
230 variable volume timing chamber
232 timing fluid flow path
234 annular recess (timing)
236 annular recess (supply)
238 annular recess (drain)
240 drain flow path
241 circumferential seal
241a small annular groove
242 timing fluid connecting means
243 circumferential seal
243a small annular groove
244 timing passage
245 washer-like element
246 flow control means
247 inwardly directed lip
248 annular groove
248a cylindrical land
249 outwardly directed surface
250 transverse passage
251 injection orifices
252 recess
253 outer circumferential seal 253a small annular groove
254 ball type check valve
256 biasing means
258 first helical spring
258a screw threads
258b screw threads
260 second helical spring
260a screw threads
260b screw threads
262 lost motion connection means
262a pin
262b anchor element
262c elongated opening
264 drain connecting means
265 leakage connecting means
266 drain passage
266a restricted portion
268 radial passages
269 leakage passage
270 cam actuated mechanism
270a arrows
271 cam lobe
272 push rod
272e arrows
273 rocker arm
274 link
274e arrow
275 plunger return means
276 sleeve like coupler
277 lower end
278 outwardly directed flange
279 compression spring
280 one sector
281 second sector
282 third sector
283 fourth sector
284 raised dimple
300 injector unit
302 injector body
304 supply passage
306 timing passage
307 variable length timing chamber
308 inner plunger section
310 outer plunger section
312 dual function drain and discharge passage
314 leakage passage
316 first lost motion connection means
316a pin
316b anchor element
318 first extension spring
320 second lost motion connection means
320a pin
320b anchor element
320c slots
322 second extension spring
324 injector cup

Industrial Applicability

A miniaturized unit injector designed in accordance with this invention would find application in a very large variety of internal combustion engines. One particularly important application would be for small compression ignition engines adapted for powering automobiles. Lighter truck engines and medium range horsepower engines could also benefit from the use of injectors designed in accordance with the subject invention.

We claim:

1. A fuel injector for injecting periodically metered quantities of fuel from a source of fuel into the combustion chamber of an internal combustion engine having a source of timing fluid which varies in pressure, comprising
   (a) an injector body containing a central bore, a feed orifice through which fuel from the fuel source may pass into said central bore and an injection orifice through which fuel metered into said central bore may pass into the combustion chamber;
   (b) an injector plunger mounted for successive cycles of reciprocatory movement within said central bore, said injector plunger including flow control means for causing fuel to be metered into said central bore through said feed orifice during a metering portion of each said cycle and for causing metered fuel to be injected through said injection orifice into the combustion chamber during an injection portion of each said cycle; and
   (c) timing means for responding to pressure variations in the timing fluid during a timing portion of each said cycle for controlling the timing of said injection portion of each said cycle and for causing timing fluid to flow through said injector body during a cooling portion of each said cycle distinct from said timing portion to cool both said injector body and said injector plunger.

2. An injector as defined in claim 1, wherein said injector plunger includes an inner plunger section and an outer plunger section mounted for reciprocal movement within said central bore to define a variable volume timing chamber between said plunger sections and wherein said timing means includes
   (a) biasing means for urging said plunger sections together with a force which is a stepped function of the distance between said plunger sections, and
   (b) timing fluid connecting means for providing a pathway for fluid under pressure to flow from a timing fluid source into said timing chamber.

3. An injector as defined in claim 2, wherein said flow control means includes an annular groove on the exterior of said inner plunger section, and wherein said inner plunger section includes a plunger passage opening into said annular groove and into said timing chamber, and further wherein said inner plunger section includes a check valve means for allowing only one way flow of fluid into said timing chamber through said plunger passage contained in said inner plunger section.

4. An injector as defined in claim 3, wherein said timing fluid connecting means includes a timing passage extending from the exterior surface of said injector body to the interior surface of said central bore, said timing passage being axially positioned along said injector body to cause timing fluid to flow into said timing chamber selectively during each reciprocal movement of said injector plunger when the pressure of the timing fluid is sufficient to overcome the force with which said plunger sections are biased together by said biasing means.

5. An injector as defined in claim 4, further including drain connecting means for providing a pathway for fuel to flow from the central bore to the exterior of said injector body, said drain connecting means including a discharge passage for timing fluid to flow from said timing chamber to the exterior of said injector body for a sufficient time during each reciprocal movement of said injector plunger to cause said timing chamber to collapse, said discharge passage including a restriction to cause sufficient high fluid pressure to develop within said timing chamber during collapse of said timing chamber to hold said inner injector plunger in its innermost position.

6. A fuel injector for use in an injector receiving recess of an internal combustion engine for injecting periodically into a combustion chamber of the engine a portion of the fuel received from a supply port opening into the recess and for returning all the fuel received and not injected to an axially spaced drain port which also opens into the recess and further having a timing port opening into the injector receiving recess for supplying variable pressure timing fluid to the fuel injector, said fuel injector comprising (a) an injector body shaped to be inserted into the recess to form a supply flow path extending between the supply port and the exterior surface of said injector body and to form further a drain flow path, isolated from said supply flow path, extending between the drain port and the exterior surface of said injector body and to form still further a timing flow path, isolated from said supply and drain flow paths, extending between the timing port and the exterior surface of said injector body, said injector body including a central bore coaxial with the longitudinal axis of said injector body and an injection orifice located adjacent the inner end of said central bore;

(b) supply connecting means providing a pathway for fuel under pressure to flow from said supply flow path into said central bore;

(c) drain connecting means providing a pathway for fuel to flow from the central bore into the drain flow path;

(d) timing fluid connecting means providing a pathway for fluid flow from the timing flow path into said central bore;

(e) an injector plunger mounted for reciprocal movement within said central bore between an innermost position in which said injection orifice is closed by the inner end of said injector plunger and an outermost position in which an injection chamber is formed within said central bore between said inner end of said injector plunger and said injection orifice, said injector plunger includes an inner plunger section and an outer plunger section mounted for reciprocal movement within said central bore to define a variable volume timing chamber between said plunger sections; and (f) flow control means (1) for causing timing fluid to be selectively supplied to said timing chamber to vary injection timing, (2) for causing fuel to be metered into said injection chamber from said supply pathway whenever said injector plunger is more than a first predetermined axial distance from said innermost position and (3) for causing fluid flow through said injector body from the timing flow path to cool said injector whenever said injector plunger is less than a first predetermined axial distance from said innermost position.

7. An injector as defined in claim 6, wherein said injector body includes three axially spaced recesses on the exterior surface shaped to form the supply, drain and timing flow paths, respectively, and further including seal means for forming circumferential seals between said injector body and the recess within which said injector body is designed to be operatively placed in order to isolate fluidically the supply, drain and timing flow paths.

8. An injector as defined in claim 7, wherein said supply connecting means includes a supply passage extending from said central bore to said annular recess forming the supply flow path, wherein said drain connecting means includes a drain passage extending between said central bore and said annular recess forming the drain flow path and said timing fluid connecting means includes a timing passage extending between said central bore and said annular recess forming the timing fluid flow path.

9. An injector as defined in claim 8, wherein said supply passage and said timing passage are formed along respective straight paths perpendicular to the longitudinal axis of said injector body.

10. An injector as defined in claim 9, for use with an internal combustion engine in which the timing fluid is the same as the fuel supplied to the injector, and further including leakage connecting means providing a pathway for fuel leaked outwardly from said timing chamber to flow into the drain flow path, said leakage connecting means including an annular cavity extending outwardly from said central bore and a leakage passage extending from said annular cavity to the drain pathway.

11. An injector as defined in claim 2, wherein said flow control means includes an annular groove on the exterior of said inner plunger section, and wherein said inner plunger section includes a plunger passage opening into said annular groove and into said timing chamber, and further wherein said inner plunger section includes a check valve means for allowing only one way flow of fluid into said timing chamber through said plunger passage contained in said inner plunger section.

* * * * *